April 8, 1947.   S. A. WOHLER   2,418,565
SHEAVE-CABLE CONNECTION
Filed Sept. 17, 1943

INVENTOR
Stanley A. Wohler.

BY John P. Tarbox
ATTORNEY

Patented Apr. 8, 1947

2,418,565

UNITED STATES PATENT OFFICE 2,418,565

SHEAVE-CABLE CONNECTION

Stanley A. Wohler, Lansdale, Pa., assignor to The Budd Company, Philadelphia, Pa., a corporation of Pennsylvania Application September 17, 1943, Serial No. 502,809

4 Claims. (Cl. 24—135)

This invention relates to a cable clamp and has for an object the provision of improvements in this art.

One of the particular objects of the invention is to provide a cable clamp which will securely grip the cable but which will not flatten it beyond a predetermined amount.

Another object is to provide a cable clamp which is simple, sturdy, and easy to manufacture.

Another object is to provide a simple construction for applying a cable clamp to a standard type of sheave such as the composition sheave of "Micarta" or other material commonly used in aircraft for operating control surfaces.

The above and other objects and advantages of the invention will be apparent from the following description of an exemplary embodiment thereof, reference being made to the accompanying drawings thereof, wherein.

Figure 1:
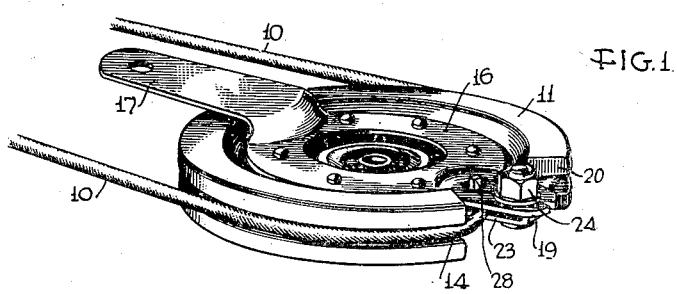
Fig. 1 is a perspective view of a sheave-cable clamp in use for converting rotary movement at the sheave into reciprocatory movement of an adjacent part.
Figure 2:
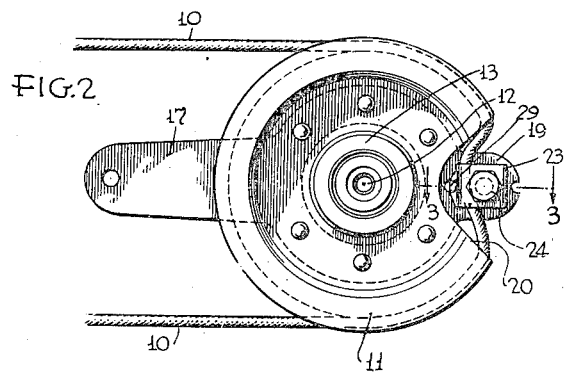
Fig. 2 is a side elevation.
Figure 3:
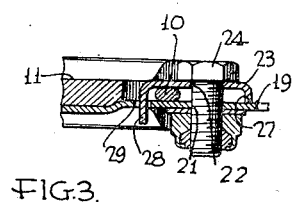
Fig. 3 is an enlarged section taken on the line 3—3 of Fig. 2.
Figure 4:
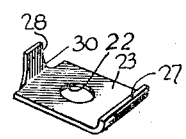
Fig. 4 is a perspective view of a clamp plate.

In the drawings the present device is illustrated in one of its principal intended uses, that of converting rotary movement of the cable around a loose sheave into reciprocatory movement of a related part, and providing the lever or actuating arm with a maximum, minimum, or any intermediate adjustment required. The need for such a connection is frequent in aircraft construction. It has been a common practice to connect the reciprocatory part directly to the cable span but this application is limited practically to the operation of parts which move in alignment with the cable span. Any angular displacement will pull the cable out of line. Moreover, there is considerable side play and the possibility of chafing is great. According to the present invention, the steady accurate movement at a pulley or sheave operating on a fixed axis is availed of, and the reciprocatory movement may be taken off in practically any direction.

Of course, many devices have heretofore been provided for connecting a reciprocating drive element to a cable at a sheave; but the present invention is believed to provide a simpler and more dependable device which may be more easily applied to standard sheaves.

The cable 10, usually of stranded steel wire, passes over a sheave 11 which is mounted for free rotation on a shaft 12. The body of the sheave may be a pressed plastic composition, such as "Micarta," and has a bearing hub 13 integrally molded therein. The circumference of the sheave is provided with a groove 14.

A sheave of this nature is strong enough for its normal intended purposes but is not so well adapted to take the strains which would be imposed if it were the connecting element between the cable and a reciprocated part, as has been the case in some prior constructions. According to the present invention, other means are provided for transmitting load between the cable and the driven part.

These means are embodied in an attachment which is applied to the sheave, this attachment including an annular plate 16 which is riveted or bolted to the web of the sheave, as by rivets here, passing through holes made in the sheave. A backing plate may be disposed on the other side of the web if desired, and in case of heavy loads a part which is generally similar to the present plate 16 with its related parts may be employed.

The plate 16 carries an integral actuating arm 17 for connection to any suitable rod or other reciprocating member. On another radius either opposite the arm 17 as here illustrated or at any other radius of the circle, the plate 16 carries a cable clamp arm 19. The arm 17 is here offset outward to pass the edge of the sheave, and the arm 19 is offset inward to lie against the side of the cable as the cable lies properly in the groove of the sheave.

The sheave is cut away at the circumference, as at 20, to accommodate the arm 19 and related parts. From Fig. 1 it will be noted that the recess 20 is deep enough to permit the cable to be bent inward toward the sheave axis at the clamp arm.

The cable is secured to the clamp arm 19 by a clamp plate 23 and a bolt 24 which passes through aligned holes 21, 22 in the arm 19 and plate 23 respectively. Of course a screw may be substituted if metal thickness permits and if it should be preferred.

On one side of the bolt hole the clamp plate is provided with a bent flat-ended stop or abutment 27 which engages the side of the arm. The length of the abutment is accurately fixed relative to the diameter of the cable to be clamped.

On the other side of the bolt hole the clamp plate 23 is provided with a bent finger 28 which enters a hole 29 of accurately made size in the arm 19. The finger is tapered so as to stop at a definite point in the hole. This stop point is also accuratey fixed relative to the diameter of the cable. The cable must be flattened to some extent to clamp it but if flattened too much it is weakened and the strands are likely to break.

Preferably the taper of the finger is quite abrupt at the point of tightening, as made by the curved shoulders 30, to prevent undue wedging in and enlargement of the hole. The shape is of advantage in forming the clamp plate in that it avoids breakage when the die press parts form and bend the plate. In any event, abrupt shoulders are avoided along the bent portion although, if desired, distinct stop shoulders may be provided at the point where the finger brings up against the clamp arm.

The finger, in addition to acting as a stop in cooperation with the other stop or abutment 27, serves in conjunction with the bolt 24 as a guide to keep the clamp plate in proper alignment across the cable, making for uniform clamping effects and avoiding damage to the cable. Further than this, the finger, when the blank is in the flat, serves with the center hole to locate the blank accurately for bending operations, a pin entering the hole and the finger laterally entering a recess on a given radius from the pin.

The clamp may, of course, have uses apart from a sheave but it has particular advantages when used therewith.

It will now be seen that the invention provides an improved sheave-clamp device which is very simple yet very easy to install and efficient in use; also that the particular details greatly simplify the manufacture of the device.

While one embodiment has been specifically illustrated and described it will be understood that the invention may have various embodiments and uses within the limits of the prior art and the scope of the subjoined claims.

What is claimed is:

1. A sheave-clamp for a cable comprising in combination, a sheave having a circumferential cable groove with a segmental recess cut out, an annular plate secured to the web of the sheave, an integral operating arm on said plate axially offset away from the sheave to pass its outer edge, an integral clamp arm on said plate axially offset toward the sheave to place its end in said recess alongside the cable, said clamp arm having a bolt hole and an adjacent finger hole therein, and a clamp plate securing said cable to the clamp arm, a clamp bolt for holding the cable in an inward bend and securing the clamp plate to the clamp arm, said clamp plate having an abutment at its outer end engaging the clamp arm and a tapered finger at its inner end entering the hole therefor in the clamp plate and engaging the hole edge to hold the clamp plate in proper radial position and to act as a stop in conjunction with said abutment to prevent undue flattening of the cable.

2. A cable clamp comprising in combination, a clamp backing member having a bolt hole and an adjacent finger hole therein, a clamping member secured to said backing member and adapted to press upon the cable, and means to secure the clamping member to the backing member, said clamping member having a center hole, a bent flat ended stop at one end, and a bent tapered finger stop at the other end entering the hole therefor in the backing member, the finger hole having a predetermined relative size relationship such that the finger sides stop against the hole sides.

3. A cable clamp as set forth in claim 2 further characterized by the fact that the bent portion of said finger is defined on the sides by arcuate shoulders which stop against the hole sides.

4. A cable clamp comprising in combination, a clamp backing member having a finger hole therein, a clamping member secured to the backing member and adapted to press upon the cable, and means to secure the clamping member to the backing member, said clamping member having a hole to receive the said securing means, an integral lateral stop at one end engaging the side of the backing member, and an integral lateral finger stop at the other end entering the said finger hole and engaging the backing member at the hole edge.

STANLEY A. WOHLER.

REFERENCES CITED

The following references are of record in the file of this patent:

UNITED STATES PATENTS

| Number | Name | Date |
|---|---|---|
| 1,979,091 | Alsaker et al. | Oct. 30, 1934 |
| 658,219 | Niles | Sept. 18, 1900 |
| 2,219,846 | Meyer | Oct. 29, 1940 |

FOREIGN PATENTS

| Number | Country | Date |
|---|---|---|
| 361,766 | German | Oct. 19, 1922 |